3,213,026
PROCESS FOR PRODUCING MAGNETIC
CARBON BLACK COMPOSITIONS
Merrill E. Jordan and Harvey M. Cole, Walpole, William
G. Burbine, Whitman, and David L. Petterson, Wollaston, Mass., assignors to Cabot Corporation, Boston,
Mass., a corporation of Delaware
No Drawing. Filed Mar. 29, 1962, Ser. No. 183,402
9 Claims. (Cl. 252—62.5)

This invention relates to a novel process for making magnetic carbonaceous black pigments and the novel carbonaceous black pigments resulting therefrom.

The principal object of the present invention is to provide a novel carbonaceous black pigment which is permanently susceptible to magnetic lines of force.

Another object of the present invention is to provide a process for selectively and precisely producing finely divided fillers or pigments which manifest predetermined degrees of permanent magnetic susceptibility.

Another object of the present invention is to provide a process for producing magnetic products from a variety of readily available compounds heretofore not utilized for such purposes, which magnetic products have diverse applications as pigments in inks or paints and/or as finely divided fillers in rubbers and plastics and the like.

Still another object of the present invention is to provide a simple integrated process for producing modified furnace-type carbon blacks wherein the collection of such novel blacks is greatly facilitated by the modified nature thereof.

Other objects and advantages of the present invention will in part be obvious and will in part appear hereinafter.

We have discovered a simple yet very effective process for producing modified furnace-type carbon blacks having novel magnetic properties, which process at the same time permits said magnetic properties of the resulting blacks to be selectively predetermined. In accordance with our invention the above objects and advantages are realized by introducing an additive comprised essentially of a material containing iron, nickel or cobalt into the enclosed conversion zone of the furnace in which the carbon black is being formed from a make hydrocarbon.

We have discovered that the novel properties manifested by the carbon blacks produced in accordance with our invention appear to be a direct function of the amount of the metal from the additive (i.e., iron, nickel or cobalt) which remains associated with the finished carbon black; and for most purposes the amount of said metal associated therewith need only be a minor fractional part of the total black pigment produced. However, at any given concentration, the degree of effectiveness of any given additive in imparting the novel properties to the final black will depend almost exclusively upon the particular metal and the particular compound thereof utilized. In turn, for any particular additive containing the aforementioned metals, we have discovered that the amount of residual metal on a carbon black produced therewith is a direct function of the concentration of the particular additive utilized in the production process.

Accordingly, the exact amount of a particular additive used in accordance with the teachings of the present invention will depend primarily upon the metal content thereof and the ultimate degree of magnetic properties desired in the final black product.

Although the addition to the carbon formation zone of additives in amounts sufficient to provide as little as about 200 parts by weight of iron, nickel and/or cobalt per million parts by weight of make hydrocarbon may effect slight changes in the properties of the resultant black which are significant for some limited purposes, concentrations above about 1000 parts by weight of said metals per million parts of the make hydrocarbon used are greatly preferred for most applications. As stated, we have found that the amount of the additive element (iron, cobalt or nickel) which remains associated with the finished black is, for a given process and method of addition, largely a function of the relative amount of the additive element utilized initially. Accordingly, one can effectively utilize the process disclosed in this invention to produce blacks containing varying amounts of iron, cobalt, nickel or mixtures thereof. Such discoveries indicate that the upper limit of the amount of the particular additives used in accordance with the teachings of the present invention will be dictated by the ultimate properties desired in the final black pigment, or at least, by the ultimate additive metal content thereof desired. However, from a practical and economical viewpoint and in order to avoid the use of special and costly equipment, or modifications of the normal flame configurations, or modification of the furnace combustion zones, etc., we have found that it would not be desirable to operate with an amount of additive equivalent to above about 100,000 parts by weight of the metals per million parts by weight of make hydrocarbon. Accordingly, although the amount of the additive metal utilized in accordance with the teachings of this invention may, for some purposes, be in amounts sufficient to supply up to about 300,000 parts by weight of the metals per million parts of make hydrocarbon, or even somewhat higher, nevertheless the preferred embodiment of the present invention contemplates the use of from about 1000 parts to about 100,000 parts of iron, nickel and/or cobalt per million parts of make hydrocarbon.

The furnace blacks produced in accordance with the teachings of the present disclosure possess many unusual and desirable properties. One of the most unusual properties thereof is the susceptibility of such blacks to the influence of magnetic lines of force. We are unable to determine the exact mechanism involved in the production of the intrinsically novel blacks produced in accordance with the teachings of our invention nor are we able to explain why a minor amount of residual additive metal can so effectively impart such novel properties to the black. According to a hypothesis which we have postulated to explain our discovery but to which we do not intend to be bound, we postulate that the metal component of the additive, when introduced to the conditions of a conversion zone of the furnace, is converted—probably by reduction—to a magnetic specie and the so formed magnetic specie, because it co-exists with the carbon black at the instant of its inception—that is, while the carbon black exists in its "status nascendi," is able to become uniformly and intimately associated with the co-produced black to form a product having permanent magnetic properties. This hypothesis is consistent with our findings pertaining to the ultimate product itself. For example, although the ingredients of a physical mixture of an extremely finely divided magnetic substance and carbon black may be easily separated by ordinary magnetic means, we are unable to achieve such a separation with our product even when such a magnetic separation is attempted while our magnetic black is dispersed in water or other liquids. Also almost any physical mixture of even the most finely divided magnetic iron oxide and carbon black is easily recognized by touch. Such a combination produces a gritty sensation when rubbed. In contrast thereto, our product produces no such sensation but instead appears to be of a uniform texture. Moreover, we have also subjected samples of our magnetic carbon blacks to X-ray analysis and to electron microscope examinations. The tracings of the X-ray scattering patterns thereof reveal a general "squeezing" of the normal carbon black pattern presumably due to the presence in the carbon lattice of the free metal of the additive utilized. Other than said distortion, however, these patterns were substantially the same as would be obtained for conventionally produced furnace blacks except for some indications of the presence of very minor amounts of oxides of the metals. Accordingly, these tracings indicate that our products are of substantially the same degree of crystallinity as other furnace blacks. Electron microscope observations of numerous fields of the magnetic black indicated that the black appears to be comprised of particles very similar in size to usual carbon blacks. Continued searching of these fields revealed the presence of slight traces of foreign material, e.g., the oxides, but magnetic methods of separation yielded essentially no fractionation of the sample. On the basis of our examinations, we have concluded that the permanent magnetic properties of the carbon black are due to the presence of a magnetic species of the metal in amorphous form which is combined with the black in some unique manner. We believe that this species may be an unusual physical form of the metal which is of similar dimensions to the black particles and is thoroughly and intimately intermingled or associated therewith. Accordingly, we have concluded that the novel carbon blacks produced in accordance with the teachings of our invention are truly magnetic pigments which are characterized by uniformity of size and texture and unusual permanency of retention of uniform magnetic properties.

There are many special applications for the magnetic pigments produced in accordance with the teachings of the present invention. For example, in addition to imparting novel electrical and magnetic properties to rubbers and plastics when our pigments are used as reinforcing agents in same, our pigments would find many desirable applications in the paint industry where their use would produce an effective magnetic paint for coating woods, metals, plastics, etc. Also, we have found that the carbon blacks produced by our process produce a desirable magnetic ink. More especially, we have found that the magnetic inks produced with our blacks are superior in intensity and uniformity of color than those inks produced by physically mixing a magnetic iron oxide with carbon black. In such special applications as the aforementioned and others, wherein our magnetic carbon black is utilized primarily for its magnetic properties, we have found that the use of higher concentrations of additives—that is, amounts of the additive to provide in excess of about 5000 parts by weight of component metal per million parts of the make hydrocarbon—in the production of such carbon black produces the most desirable pigment. Accordingly, the use of the higher concentrations of the additives produces a unique carbon black having many useful and desirable commercial applications and this constitutes a distinct embodiment of the present invention.

We have also discovered that minor amounts of additives—that is amounts sufficient to provide less than about 5000 parts by weight of component metal per million parts of make hydrocarbon—are desirable for producing slightly magnetic carbon blacks which, while primarily useful in the more conventional applications for carbon blacks, are much more easily and more efficiently collected by virtue of their magnetic susceptibility. For example, a substantial reduction in over-all collection equipment costs can be realized by utilizing magnetic collection means to collect the products produced by our process, without loss in collection yields and often-times with an increase in over-all collection yield. Accordingly, the scope of our invention also includes the use of the lower concentrations of additives as a means of obtaining higher recoverable yields of carbon blacks, and the integrated process of the use of the additives in combination with magnetic collection means, either as the sole or as auxiliary method for collecting any of the blacks produced thereby, constitutes another specific embodiment of the present invention.

Broadly, the additives contemplated within the scope of the present invention are the compounds of the elements of iron, nickel and cobalt. However, we prefer those compounds of the aforementioned elements which are soluble, or dispersible or suspendable in a liquid carrier such as water, aqueous media, organic media including the hydrocarbon raw materials from which the black is being made, or in the vapors or gases which are often added to the carbon conversion zone of the furnace. Furthermore, we strongly prefer such compounds of the aforementioned elements which have relatively low decomposition temperatures, especially compounds which decompose readily below about 2300° F., which is representative of the usual temperature of the reaction zone of the furnace. Examples of the compounds of the aforementioned elements suitable for the purposes of the present invention are the various inorganic salts thereof such as the chlorides, sulfates, carbonates, etc. Other compounds of the aforementioned elements which are particularly suitable for the purposes of the present invention and which represent the preferred embodiment thereof are the various organic compounds and organic complexes thereof. Accordingly, specific examples of the preferred additives of our invention are the acetates, oxalates, formates, benzoates, oleates, tartrates, etc., of the aforementioned metals. The additives, in any of the aforementioned forms, may be supplied to the carbon conversion zone in the concentrations desired by any of the metering devices or the like well known to the art.

The following specific examples of particular embodiments of our invention are give only for the purpose of providing a fuller and more complete understanding of some of the operating details of the invention and methods of practicing same. These examples should be considered as illustrative only and not in any sense as limitative on the scope of the present invention.

In the following examples, the relative magnetic strength of the products was determined as follows:

A 1 gram sample of each carbon black product tested was placed in an aluminum dish which was suspended 18 centimeters from the fulcrum of a 36 centimeter balance beam. The so filled dish was placed against a permanent magnet and gram weights were added to the pan at the opposite end of the balance beam. The weight in grams required to remove the sample from the magnet was observed and recorded.

*Example 1*

Carbon black was produced by the furnace process in an experimental furnace wherein acetylene was used as the make hydrocarbon. The experimental furnace was equipped with a burner composed of 3 separate concentric annular tubes the upper openings of which converge at the burner tip. Acetylene was conducted through the outer annular space to the burner tip to the conversion zone, while the oxidizing media (air) was conducted through the adjacent inner annular space. The innermost of the aforementioned concentric annular spaces in the burner consists of a capillary tube through which in each of the following runs, except Run #355, a water solution of a soluble compound of iron, cobalt or nickel was added to the conversion zone at a constant rate of about 1 cc. per minute. The delivery of the solutions of the metal compounds to the conversion zone was accomplished by means of a variable speed torque converter. The properties of the resulting furnace carbon blacks were measured and the following results were obtained.

| Run No. | Fuel | Additive | Parts by weight metal introduced per million parts make hydrocarbon | Relative magnetic intensity (grams) | Percent metal in product |
| --- | --- | --- | --- | --- | --- |
| 355 | $C_2H_2$ | None | None | 0.1 | None |
| 292 | $C_2H_2$ | $FeCl_2.4H_2O$ | 87,400 | 16.2 | 4.53 |
| 287 | $C_2H_2$ | $FeCl_2.4H_2O$ | 31,300 | 10.5 | 3.78 |
| 362 | $C_2H_2$ | $FeCl_2.4H_2O$ | 4,100 | 0.9 | 1.67 |
| 289 | $C_2H_2$ | $FeSO_4.7H_2O$ | 14,100 | 3.7 | |
| 361 | $C_2H_2$ | $Ni(CHO_2)_2.2H_2O$ | 93,700 | 16.4 | |
| 325 | $C_2H_2$ | $Co(IO_3).6H_2O$ | 75,400 | 29.2 | |

Example 1 shows, that for any given additive compound, the magnetic intensity of the resulting black is a function of the amount of residual metal associated therewith, which in turn is a function of the proportion of additive metal utilized.

*Example 2*

Substantially the same procedure of Example 1 was followed, but the following modification was made in the carbon black collection system involved:

A metal 2000 ml. Erlenmeyer flask was substituted for one of the three 2000 ml. glass Erlenmeyer flasks in seriatim normally used to collect blacks produced in the experimental furnace. The metal flask was substituted for the flask which collected the final cut. A magnetic field was induced in the metal flask and maintained therein at constant strength for each of the following three runs:

| Run No. | Make Fuel | Additive | Parts by weight of metal introduced per million parts make hydrocarbon | Percent black collected in metal flask |
| --- | --- | --- | --- | --- |
| 462 | $C_2H_2$ | None | None | 8.7 |
| 485 | $C_2H_2$ | $Ni(C_2H_3O_2)_2.4H_2O$ | 4,600 | 9.4 |
| 487 | $C_2H_2$ | $Co(C_2H_3O_2)_2.4H_2O$ | 95,000 | 18.8 |

The above data illustrates that the use of both minor and large amounts of the compounds contemplated as additives in the present invention are capable of imparting magnetic properties to carbon blacks sufficient to permit said blacks to be collected more efficiently by magnetic means.

*Example 3*

A carbon black was prepared in accordance with the procedure set forth in Example 1. The time of the run was one hour. During the one hour, a total of 9.05 moles of acetylene were added to the conversion zone together with a total of 120.5 milliliters of an aqueous solution containing 30 grams of cobaltous acetate in 180 milliliters of solution. Accordingly, the cobaltous acetate was added to the reaction zone together with the make hydrocarbon at a substantially steady rate of about 18,800 parts of cobalt per million parts of make hydrocarbon. The total yield of product was 13.9 gms. and analysis of the product revealed that it contained about 9.2% cobalt metal.

A sample of the resulting carbon black was packed in a plastic capsule ½ inch long and ¼ inch in diameter so as to form a solid plug of black therein. A vibrating sample magnetometer was used to determine the following magnetic properties of the black in its bulk state:

Saturation force: The magnetizing force that will yield a magnetic flux density of approximately maximum value for a given sample of material; i.e., the saturation magnetization. Expressed in oersteds.

Coercive force: The reverse magnetizing force required to reduce the residual induction (remanence) to zero. Expressed in oersteds.

Remanence: The residual induction (or flux density) which remains when a magnetizing force is reduced to zero from a value sufficient to saturate a material. Expressed in emu/gm.

The following data were obtained:

Saturation force: 6000 oersteds
Coercive force: 80 oersteds
Remanence: 0.02 emu/gm.

As stated, for any particular compound, the magnetic properties of a product obtained in accordance with the practice of our invention will be directly proportional to the amount of component metal which remains associated with the final product. In turn, the concentration of residual component metal will usually depend chiefly upon the proportion of said metal introduced initially. Accordingly, if the preferred maximum amount of cobalt (i.e., 100,000 parts per million parts of make hydrocarbon) is utilized, a product having a concentration about 3 times as great as that obtained in the above example will be produced.

*Example 4*

A carbon black was produced by substantially the same procedure described in the preceding Example 3. In this run, however, an aqueous solution of ferrous sulfate (melanterite) was introduced continuously to the conversion zone together with the hydrocarbon make at a rate of about 54,000 parts of iron per million parts of make. Analysis of the product revealed that it contained about 7.4% of iron. The magnetic properties of the resulting black were determined as in Example 3. The following data were obtained:

Saturation force: 8000 oersteds
Coercive force: 435 oersteds
Remanence: 1.33 emu/gm.

Since the essence of our invention resides in the deliberate addition of varying amounts of an additive comprising iron, cobalt or nickel or mixtures thereof to an enclosed carbon conversion zone to produce magnetic carbon blacks, obviously many incidental modifications in operational techniques and apparatus designs may be utilized without departing from the scope of our invention. Accordingly, various modifications such as methods of introducing additive, and others which would be obvious to those well skilled in the art are contemplated by our invention and may be utilized without departing from the scope thereof.

Having described our invention, what we claim as new and desire to secure by U.S. Letters Patent is:

1. In the process for making furnace carbon black, which comprises decomposing an essentially hydrocarbon raw material in an enclosed conversion zone maintained at free carbon forming conditions with the aid of a partial combustion reaction proceeding simultaneously therein, the improvement which comprises supplying to said conversion zone a salt of an element chosen from the group consisting of iron, cobalt, nickel and mixtures thereof, said salt being supplied to said conversion zone in an amount sufficient to provide thereto at least 200 parts of the said element per million parts by weight of make hydrocarbon.

2. The process of claim 1 wherein the salt is an iron salt.

3. The process of claim 1 wherein the salt is a cobalt salt.

4. The process of claim 1 wherein the salt is a nickel salt.

5. In the process for making furnace carbon black, which comprises decomposing an essentially hydrocarbon raw material in an enclosed conversion zone maintained at free carbon forming conditions by burning combustible material therein using molecular oxygen in amounts limited to maintain reducing conditions therein, the improvement which comprises supplying to said conversion zone a salt of an element chosen from the group consisting of iron, cobalt, nickel, and mixtures thereof, said salt being supplied to said conversion zone at a substantially constant rate in an amount sufficient to provide thereto from 5000 parts to 100,000 parts of said element per million parts by weight of make hydrocarbon.

6. The process of claim 5 wherein the salt is an iron salt.

7. The process of claim 5 wherein the salt is a cobalt salt.

8. The process of claim 5 wherein the salt is a nickel salt.

9. In the process for making furnace carbon black which comprises decomposing an essentially hydrocarbon raw material in an enclosed, high temperature conversion zone supplied with molecular oxygen in amounts limited to maintain free carbon forming conditions therein, the improvement which comprises supplying to said conversion zone in addition to said hydrocarbon raw material a salt of a metal chosen from the group consisting of iron, cobalt, nickel and mixtures thereof, said salt being supplied to said conversion zone at a rate sufficient to provide at least 200 parts by weight of said metal per million parts by weight of make hydrocarbon and collecting the resulting carbon black by means of a collection system comprising a magnetic collection means.

References Cited by the Examiner

UNITED STATES PATENTS

| | | | |
|---|---|---|---|
| 1,403,305 | 1/22 | Elmen | 252—62.5 |
| 2,356,471 | 8/44 | Rehner | 23—209.8 |
| 2,914,418 | 11/59 | Eastman | 23—209.2 |
| 3,010,794 | 11/61 | Friauf et al. | 23—209.8 |

FOREIGN PATENTS 364,757   1/32   Great Britain.

MAURICE A. BRINDISI, *Primary Examiner.*